(12) United States Patent
Reynar et al.

(10) Patent No.: US 6,581,033 B1
(45) Date of Patent: Jun. 17, 2003

(54) SYSTEM AND METHOD FOR CORRECTION OF SPEECH RECOGNITION MODE ERRORS

(75) Inventors: Jeffrey C. Reynar, Woodinville, WA (US); David Allan Caulton, Redmond, WA (US); Erik Rucker, Seattle, WA (US); Paul Kyong Hwan Kim, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/420,863

(22) Filed: Oct. 19, 1999

(51) Int. Cl.⁷ .............................................. G10L 15/00
(52) U.S. Cl. ..................................... 704/231; 704/270
(58) Field of Search .............................. 704/231, 235, 704/200, 270, 277

(56) References Cited

U.S. PATENT DOCUMENTS

| 5,231,670 A | | 7/1993 | Goldhor et al. ............... 381/43 |
|---|---|---|---|
| 5,754,681 A | * | 5/1998 | Watanabe et al. ............ 382/159 |
| 5,794,189 A | * | 8/1998 | Gould .......................... 704/231 |
| 5,799,273 A | * | 8/1998 | Mitchell et al. ............. 704/235 |
| 5,799,279 A | * | 8/1998 | Gould et al. ................. 704/275 |
| 5,857,099 A | * | 1/1999 | Mitchell et al. ............. 704/235 |
| 5,909,667 A | * | 6/1999 | Leontiades et al. ......... 704/275 |
| 5,960,394 A | | 9/1999 | Gould et al. ................. 704/240 |
| 6,314,397 B1 | * | 11/2001 | Lewis et al. ................. 704/235 |

FOREIGN PATENT DOCUMENTS

| DE | 19635754 A1 | 3/1998 |
|---|---|---|
| EP | 0785540 | 7/1997 |
| WO | WO99/46763 | 9/1999 |

* cited by examiner

Primary Examiner—Doris H. To
Assistant Examiner—Michael N. Opsasnick
(74) Attorney, Agent, or Firm—Merchant & Gould, LLC

(57) ABSTRACT

A method of correcting speech recognition mode errors in a document is disclosed. A computer-readable medium having computer-executable instructions for correcting speech recognition mode errors in a document is also disclosed. Further, an apparatus for correcting speech recognition mode errors in a document is disclosed.

45 Claims, 8 Drawing Sheets

SYSTEM AND METHOD FOR CORRECTION OF SPEECH RECOGNITION MODE ERRORS

TECHNICAL FIELD

This invention relates generally to the field of computer systems and, more particularly to correcting a speech recognition mode error in a computer software program when the incorrect mode has been previously selected and speech input has been incorrectly input into the program.

BACKGROUND OF THE INVENTION

Since the advent of the personal computer, human interaction with the computer has been primarily through the keyboard. Typically, when a user wants to input information or to enter a command into a computer, the information or the command is typed on a keyboard attached to the computer. Other input devices have supplemented the keyboard as an input device, including the mouse, touch-screen displays, the integrated pointer device, and scanners. Use of these other input devices have decreased the amount of user time spent in entering data or commands into the computer.

Computer-based voice recognition and speech recognition systems have also been used for data or command input into personal computers. Voice recognition and speech recognition systems convert human speech into a format that can understood by the computer. When a computer is equipped with a voice recognition or speech recognition system, data and command input can be performed by merely speaking the data or command to the computer. The speed at which the user can speak is typically faster than conventional data or command entry. Therefore, the inherent speed in disseminating data or commands through human speech is a sought after advantage of incorporating voice recognition and speech recognition systems into personal computers.

Throughout the remainder of this disclosure, the terms "voice recognition" and "speech recognition" will be used synonymously. In some instances, a distinction is made between voice recognition and speech recognition. However, both voice recognition and speech recognition systems suffer from the same problems described herein, and the same solutions have been applied to both recognition technologies to resolve the shortcomings of the prior art.

The increased efficiency of users operating personal computers equipped with speech recognition systems has encouraged the use of such systems in the workplace. Many workers in a variety of industries now utilize speech recognition systems for numerous applications. For example, computer software programs utilizing voice recognition and speech recognition technologies have been created by DRAGON, IBM, and LERNOUT & HAUSPIE. When a user reads a document aloud or dictates to a speech recognition program, the program can enter the user's spoken words directly into a word processing program operating on a personal computer.

Generally, computer-based and speech recognition programs convert human speech into a series of digitized frequencies. These frequencies are matched against a previously stored set of words, or phonemes. When the computer determines correct matches for the series of frequencies, computer recognition of that portion of human speech is accomplished. The frequency matches are compiled until sufficient information is collected for the computer to react. The computer can then react to certain spoken words by storing the human speech in a memory device, transcribing the human speech into a document for a word processing program, or executing a command in a program module, such as an application program.

However, speech recognition systems are not 100% reliable. Even with hardware and software modifications, the most proficient speech recognition systems can attain approximately 97–99% reliability. Internal and external factors can affect the reliability of speech recognition systems. Factors dependent upon the recognition technology itself include the finite set of words or phonemes and the vocabulary of words to compare the speaker's input to. Environmental factors such as regional accents, external noise, and the microphone can degrade the quality of the input, thus affecting the frequency of the user's words and introducing potential error into the word or phoneme matching.

A speech recognition software program can be used to input commands or text into other application programs. For example, Kurzweil's "VOICEPRO" speech recognition software can be used to input text or commands into a document created by a word processing application program, such as MICROSOFT WORD. When a user chooses to use the speech recognition program to enter a command, the user manually selects the command mode in the speech recognition program. The user then speaks the command, such as "delete". The speech recognition program processes the command, and sends the "delete" command to the word processing program for execution of the command. Most mode selection is done automatically, and the errors come from the machine getting the mode wrong rather than user error. The net effect is the same, though. If the user chooses to use the speech recognition program to enter text into a document, the user manually selects the dictation mode in the speech recognition program. The user then begins to speak the text to be input, such as "where do you want to go today". The speech recognition program processes the speech, and sends the processed speech to the word processing program to be input into the document. The user selection of a mode is necessary for the speech recognition software to correctly process the user's speech input. Manual selection of the speech recognition mode before the user speaks is cumbersome and time consuming.

Occasionally, the user forgets to change the mode of the speech recognition program before speaking. For example, if the speech recognition program is in the command mode and the user says "copy machines make copies not coffee", the speech recognition program will process the speech input "copy machines make copies not coffee" as a command. The speech input "copy" will be executed by the application program, but the remaining speech may not be understood as a command, and the application program will not process the speech.

On other occasions, the speech recognition program will be in the dictation mode and the user will want the word processor to execute a command. If the user forgets to change the mode and says "copy", the speech recognition program will process the speech as dictation and the speech input will be entered as text into the application program.

Various solutions to the mode error problem have been attempted. The typical correction procedure involves the circumstance described above, when the user forgets to change the mode before speaking, resulting in a mode error. Sometimes, the mode error is compounded by the circumstance where the user does not realize he is in the wrong mode and the speech input is processed in the incorrect mode from the time the initial mode error was made. If the speech input has been incorrectly input as dictation, then the user can manually delete the dictation that has been input into the application program as text. The user continues the correction procedure by manually selecting the command mode before speaking again. If the speech input has been incorrectly input as a command, then the user can manually "undo" the executed command in the application program. The user continues the correction procedure by manually selecting the dictation mode before speaking again. The manual selection of the correct speech recognition mode and the manual correction of the "undo" or "delete" commands can be cumbersome and time consuming.

Thus, there is a need in the art for a method that reduces user time in correcting speech recognition mode errors.

There is a further need in the art for a method that reduces the number of keystrokes or commands in correcting speech recognition mode errors.

SUMMARY OF THE INVENTION

The present invention meets the needs described above in a speech engine correction module for correcting speech recognition mode errors. The speech engine correction module can reduce user time in correcting speech recognition mode errors. Furthermore, the speech engine correction module can reduce the number of keystrokes and commands needed to correct a speech recognition mode error.

Generally described, the invention is a speech engine correction module having a speech recognition program and a speech engine. The speech recognition program is configured to receive speech for entry into a document for a program, such as a word processor. When the speech recognition program receives speech input, the program processes the speech input for recognition the speech engine. The speech recognition program then sends the speech input to the speech engine.

The speech engine receives the speech input from the speech recognition program, and further processes the speech input. A command processor and a dictation processor each process the speech input as a command and as dictation, respectively. The results from each processor can be stored in a memory device, such as RAM, for later retrieval.

The speech engine determines a speech recognition mode for the speech input using a mode selection processor. The mode selection processor uses criteria such as the context and the content of the speech input to determine a speech recognition mode for the speech input. After the mode selection processor selects a mode, the speech input is sent by the speech engine to the program for entry into the document as dictation or as a command.

A mode correction processor detects when a speech recognition mode error has been made. Typically, the user can send a command from the program to indicate that a speech recognition mode error has been made. When the mode correction processor receives a command indicating a speech recognition mode error, the mode correction processor initiates a correction routine corresponding to the type of speech recognition mode error.

When a command speech recognition error has been made, that is, when speech input has been incorrectly entered as a command, then a command to dictation routine is executed by the speech engine. The mode correction processor sends an "UNDO" command to the program to remove the entered command applied to the document. Next, the mode correction processor selects a candidate selection from the alternative dictation selections stored in RAM. The mode correction processor copies the alternative selections from RAM and sends the alternative selections to the program. The candidate selection is then entered in the program as a dictation into the document.

When a dictation error has been made, that is, when speech input has been incorrectly entered as dictation, then the dictation to command routine is executed by the speech engine. The mode correction processor sends a "DELETE" command to remove the dictation input entered into the document. Next, the mode correction processor selects a candidate selection from the alternative selections stored in RAM. The mode correction processor processes the candidate selection and enters the candidate selection in the program as a command in the document.

According to an aspect of the invention, prior to processing the speech input with the dictation processor and the command processor, the mode selection processor can determine a speech recognition mode for the speech input. The speech input is processed by the selected mode processor, and the results are stored in the RAM. The mode selection processor stores the speech input in the RAM for later retrieval. When a speech recognition mode error is detected by the mode correction processor, the mode correction processor sends an "UNDO" command to remove a command, or executes a "DELETE" command to remove dictation from the document. Then, the speech input is retrieved from RAM and, processed by the alternative mode processor to obtain results for correction of the mode error. The alternative results are then sent to the program to be entered into the document.

That the invention improves over the drawbacks of the prior art and accomplishes the advantages described above will become apparent from the following detailed description of the exemplary embodiments and the appended drawings and claims.

DETAILED DESCRIPTION OF DISCLOSED EMBODIMENTS

The invention may be implemented as a speech engine correction software module that implements a mode correction routine for a document. As an object-oriented program, the speech engine correction module exposes a standard interface that client programs may access to communicate with the speech engine correction module. The object-oriented architecture permits a number of different client programs, such as a word-processing program, a desktop publishing program, application programs, and so forth, to use the speech engine correction module. For example, the speech engine correction module can be used with an application program such as Microsoft WORD.

The interface exposed by the speech engine correction module allows the module to receive speech input for the program. The speech engine correction module receives the speech input for the program, processes the speech input as dictation and/or as a command, stores the processed speech input as dictation and/or command, selects a speech recognition mode for the speech input, detects when a speech recognition mode error has occurred, and corrects speech recognition mode errors in a document for the program.

The speech engine correction module may be configured into two components, the speech recognition program and the speech engine. The speech recognition program receives the user's speech input for the program, processes the user's speech input into a stochastic result for the speech engine, interacts with the program, and calls to the speech engine as necessary. The speech engine interacts with the speech recognition program to receive the stochastic result or speech input, processes the stochastic result or speech input as dictation and/or command, stores the results of the processed dictation and/or command, selects a speech recognition mode for the stochastic result or speech input, detects a speech recognition mode error, corrects speech recognition mode errors, and calls to the program as necessary.

Exemplary Operating Environment

Figure 1:
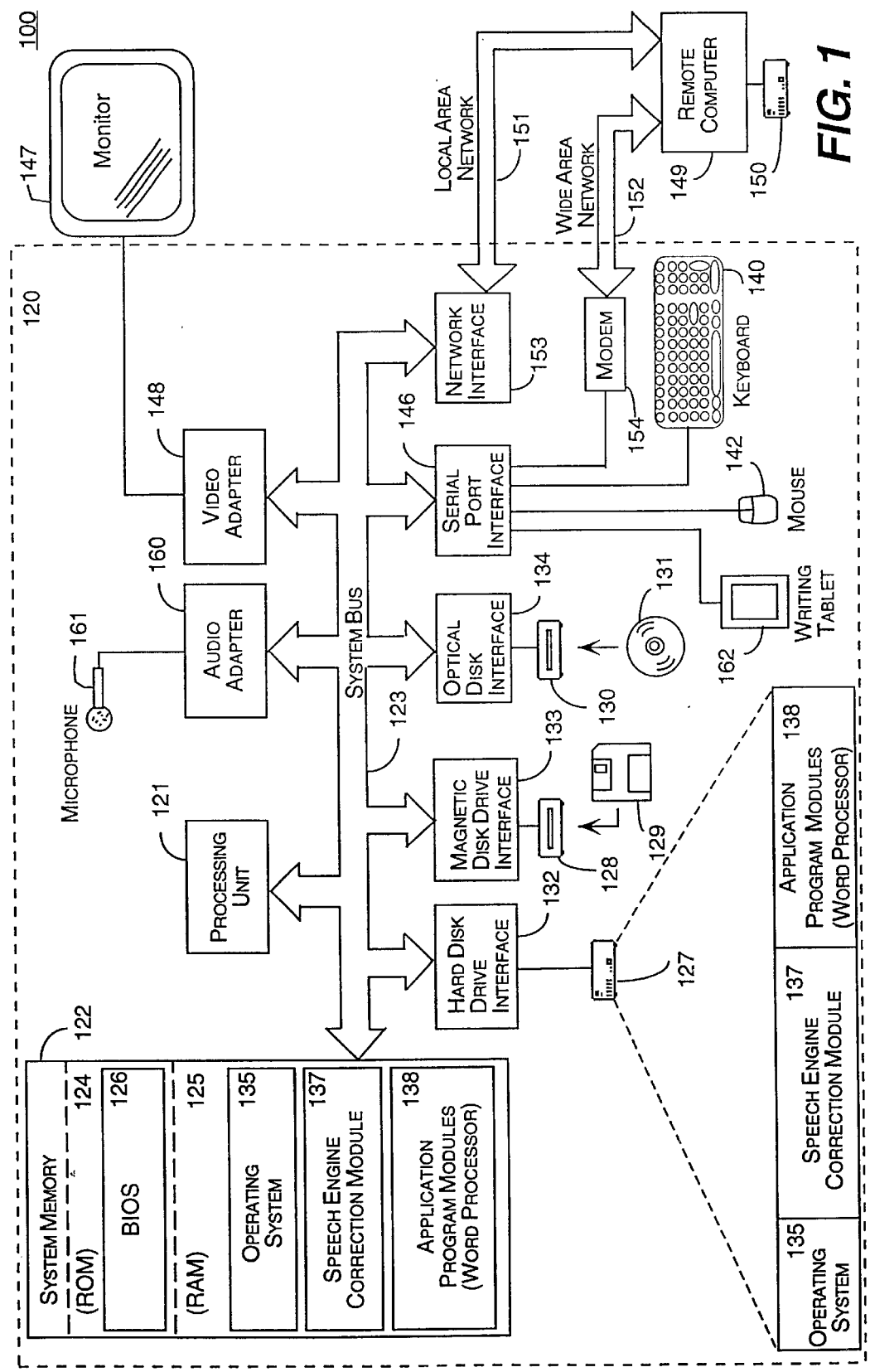
FIG. 1 is a functional block diagram of a personal computer system hat provides the operating environment for the exemplary embodiments of the invention.

FIG. 1 and the following discussion are intended to provide a brief and general description of a suitable computing environment 100 for an implementation of the present invention. The exemplary operating environment 100 includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable magnetic disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A user may enter commands and information into the personal computer 120 through conventional input devices, including a keyboard 140 and pointing device, such as a mouse 142. A microphone 161 may be used to enter audio input, such as speech, into the computer system 120. A user may enter graphical information, such as drawings or handwriting, into the computer system by drawing the graphical information on a writing tablet 162 using a stylus. The computer system 120 may include additional input devices (not shown), such as a joystick, game pad, satellite dish, scanner, or the like. The microphone 161 can be connected to the processing unit 121 through an audio adapter 160 that is coupled to the system bus. The other input devices are often connected to the processing unit 121 through a serial port interface 146 that is coupled to the system bus, but may be connected by other interfaces, such as a game port or a universal serial bus (USB).

A monitor 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over a WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

A number of program modules may be stored in the drives and RAM 125 of the computer system 120. Program modules control how the computer system 120 functions and interacts with the user, with I/O devices or with other computers. Program modules include routines, operating system 135, application program modules 138, data structures, browsers, and other software or firmware components. The invention may conveniently be implemented in one or more program modules, such as a speech engine correction module 137 based upon the methods described in the detailed description.

Figure 2:
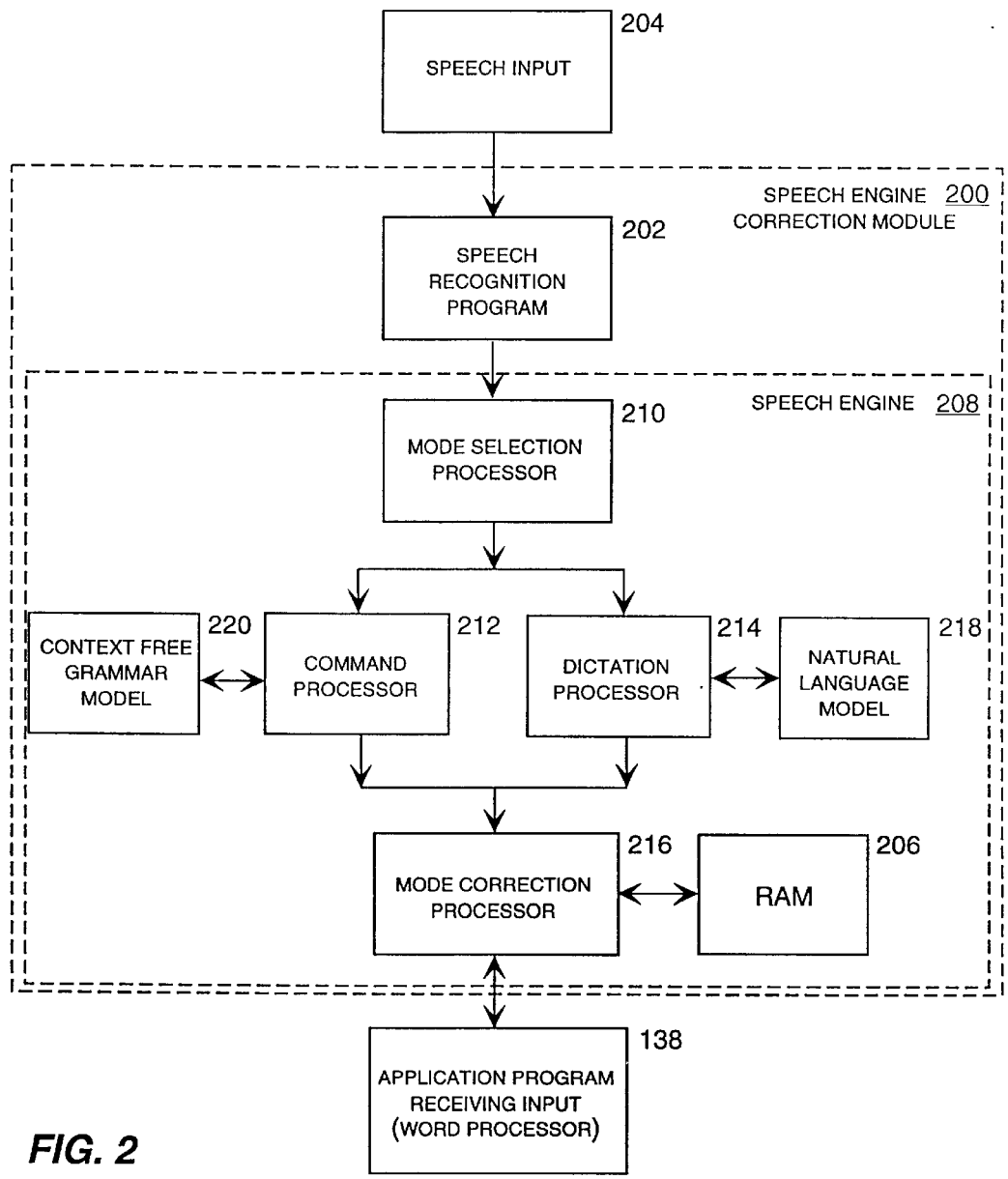
FIG. 2 is a functional block diagram that illustrates the components of speech engine correction module for correcting speech recognition mode errors n accordance with an exemplary embodiment of the present invention.

The application program modules 138 may comprise a variety of applications used in conjunction with the present invention, some of which are shown in FIG. 2. The purposes of and interactions between some of these program modules are discussed more fully in the text describing FIG. 2. These include a word processor program (such as WORD, produced by Microsoft Corporation of Redmond, Wash.), a handwriting recognition program module, the speech engine correction module 137, and an input method editor (IME).

No particular programming language will be described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Overview of Program Modules

FIG. 2 provides an overview of the components and modules of a speech engine correction module 200. Generally, the purpose of the components and modules shown in FIG. 2 is to correct speech recognition mode errors that can result when speech is input to an application program 138, such as a word processor.

The components and modules shown in FIG. 2 enable a user to correct speech recognition mode errors for speech input into documents for an application program 138. The speech engine correction module 200 includes a speech recognition program 202 or other similar type program modules to receive speech input 204 for the application program 138. The speech recognition program 202 receives speech input 204 from the user through a microphone 161 run by a microphone driver module in the operating system 135. Speech is often difficult to interpret because many words that sound alike have different meanings and spellings, so the speech recognition program 202 produces a stochastic result. The stochastic result can be stored in RAM 206 for later retrieval by the speech engine module 200.

The speech engine correction module 200 also includes a speech engine 208 with the following components: a mode selection processor 210, a dictation processor 214, a command processor 212, a mode correction processor 216, and a memory device such as RAM 206. The mode selection processor 210 receives the speech input from the speech recognition program 202, and determines a speech recognition mode for the speech input 204. In one embodiment, the mode selection processor 210 can be bypassed, effectively sending the speech input 204 to both the dictation processor 214 and the command processor 212 to be processed.

When the speech input 204 is received by the dictation processor 214, the dictation processor 214 processes the speech input 204 as dictation to be input into the application program 138. Using a natural language model 218, such as a statistical language model (SLM), the dictation processor 214 returns a text string for the given speech input 204. Other language models can be used to process the speech input 204 to return a text string for use in the application program 138.

When the speech input 204 is received by the command processor 212, the command processor 212 processes the speech input 204 as a command to be input into the application program 138. Using a context-free grammar (CFG) language model 220, the command processor 212 returns a command for the given speech input 204. Other language models can be used to process the speech input 204 to return a command for use in an application program 138.

In an alternative embodiment, the mode selection processor 210 determines a speech recognition mode for the speech input 204 and sends the speech input 204 to a particular processor depending upon which mode has been selected. Selection criteria to determine a speech recognition mode can be the content of the speech input 204 and the context of the speech input 204.

After speech recognition mode results are returned by the dictation processor 214 and/or the command processor 212, the mode correction processor 216 receives the results and calls the results to the application program 138 for input or entry into the document. The mode correction processor 216 can also store the results in a memory device such as RAM 206 for later retrieval.

A memory device such as RAM 206 is useful to store speech input 204 or processed speech input 204. The RAM 206 can comprise a data structure capable of storing speech input 204 data such as a stochastic model. Two useful structures for doing so are a lattice and an "n-best" alternatives list. A lattice is a structure that is well known to those skilled in the art, so a complete description will not be given. Briefly, however, a lattice stores words or phrases produced by a speech input source in nodes. Because each word or phrase is speech input data, the node also stores a probability assigned to the associated word or phrase. Using methods well known to those skilled in the art, the lattice can be traversed in order to produce likely alternatives for any section of text represented by the speech input data. Furthermore, lattices representing adjacent pieces of text can be combined into a larger lattice through a process known as concatenation. The larger lattice can then be traversed to produce alternatives for the adjacent pieces of text. Alternatively, speech input data may be represented by a list of the n-best alternatives and their associated probabilities. For any given word or phrase, an n-best alternatives list may be produced from a lattice representing the word or phrase.

The mode correction processor 216 also detects mode correction commands from the application program 138, and waits for a mode correction command to be sent to the speech engine correction module 200. When a mode correction command is received or detected, the mode correction processor 216 initiates a mode correction routine dependent upon the type of speech recognition error that has been made, and the results or speech input 204 that have been previously saved in RAM 206.

In the embodiment where speech input 204 results from both the dictation processor 214 and command processor 212 have been returned, the mode correction processor 216 can retrieve the alternative results from RAM 206. These results can then be passed to the application program 138 for input into the document.

In the alternative embodiment where the mode selection processor 210 selected the incorrect processor, the mode correction processor 216 can retrieve the speech input 204 from RAM 206. The speech input 204 is then processed by the alternative processor not initially selected by the mode selection processor 210. The results from the alternative processor are then called to the application program 138 for input into the document.

After the application program 138 receives the results, the user can view the alternative results to determine the accuracy of the speech input 204. For example, if a dictation result has one or more alternative dictations for the speech input 204, the user can select a candidate presented to the user through a graphical user interface. If the user chooses one of the alternative dictations, then the application program 138 can replace the dictation with the chosen candidate, and the chosen candidate is input into the document.

Although the various components and modules have been described separately, one skilled in the art should recognize that the components and modules could be combined in various ways and that new program components and modules could be created to accomplish similar results.

The Speech Engine Module Routines

Figure 3:
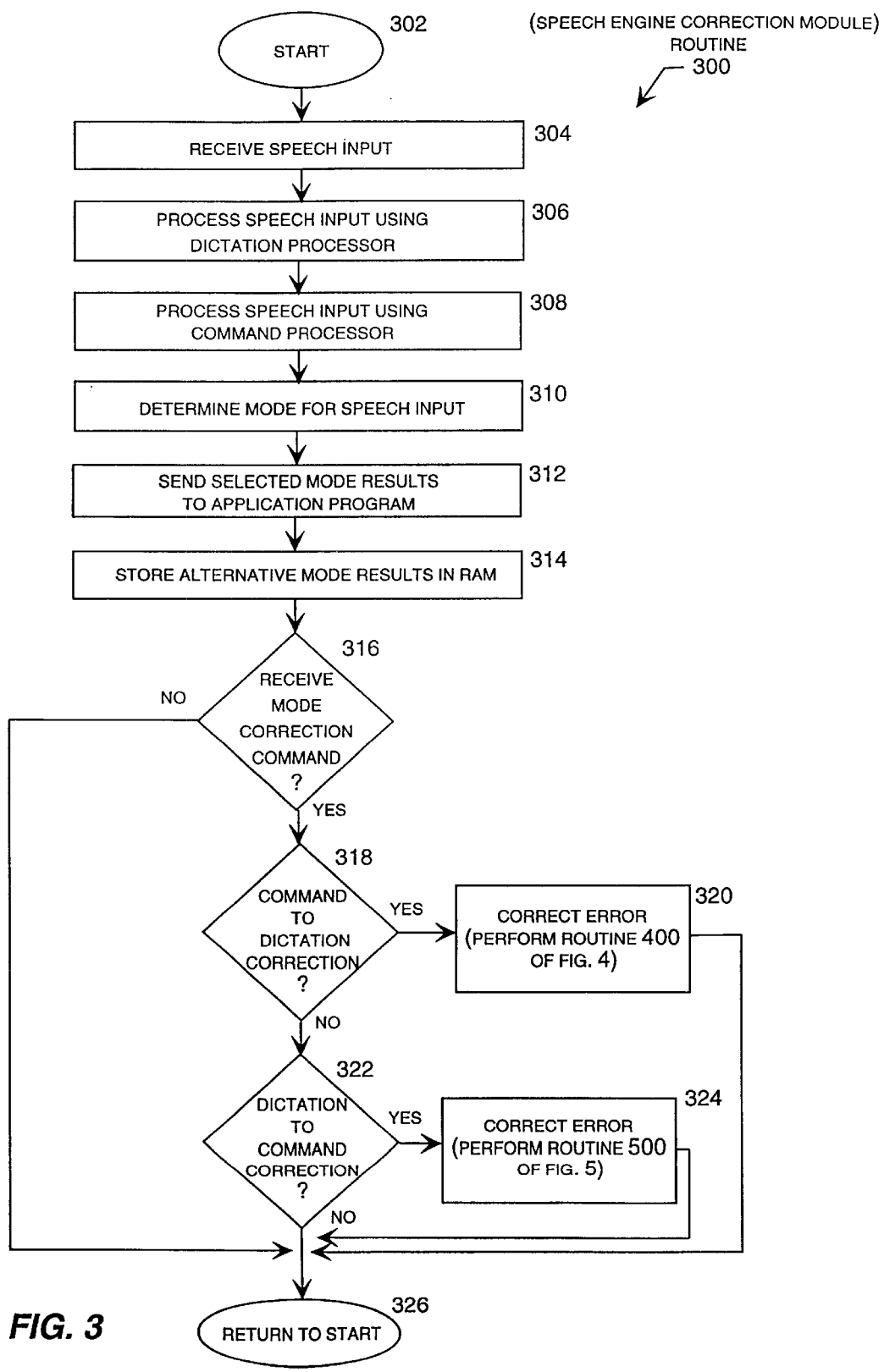
FIG. 3 is a logic flow diagram illustrating an exemplary method for correcting speech recognition mode errors.

FIG. 3 is a logic flow diagram illustrating a computer routine for correcting a speech recognition mode error in a document. The steps illustrated in FIG. 3 are performed by the speech engine correction module 200 operating with the application program 138. Step 302 starts the routine 300 performed by the speech engine correction module 200.

Step 302 is followed by step 304, in which the speech engine correction module 200 waits for speech input 204 from the application program 138. When speech input 204 is received by the speech engine correction module 200, step 304 is followed by step 306.

In step 306, the dictation processor 214 processes the speech input 204. The dictation processor 214 uses the natural language model 218, such as a statistical language model (SLM), for determining the dictation content of the speech input 204. Such models are commonly used in the art for converting speech input into text for a computer-readable document. Models can use clues, such as grammar and the overall meaning of a section of text, or probabilities of word sequences, to produce additional alternatives for a candidate list and evaluate the probabilities of those alternatives. A suitable natural language model 218 always returns text results for a given speech input. After the dictation processor 214 determines a text result for the speech input 204, then step 306 is followed by step 308.

In step 308, the command processor 212 processes the speech input 204. The command processor 212 uses the context-free grammar (CFG) language model 220 for determining the command content of the speech input 204. Such models are commonly used in the art for converting speech input into a command result for a given speech input. A suitable CFG model returns an application program command sufficiently similar to the speech input 204. After the command processor 212 determines a command result for the speech input 204, then step 308 is followed by step 310.

In step 310, the mode selection processor 210 determines a speech recognition mode for the speech input 204. Based upon dictation selection criteria, the mode selection processor 210 determines the speech recognition mode and continues processing the speech input 204 according to the selected speech recognition mode. Suitable selection criteria can be the context of the speech input and document, and content of the speech input. For example, when the mode selection processor 210 encounters speech input consisting of the single word "delete", the mode selection processor 210 may decide based upon the literal context of the speech input 204 and document, and from the content of the speech input 204 that the speech input 204 is a command. Thus, the mode selection processor 210 continues processing the speech input 204 as a command. When a speech recognition mode has been selected by the mode selection processor 210, then step 310 is followed by step 312.

In step 312, the mode selection processor 210 sends the selected mode processor results to the application program 138. For example, if the command processor 214 returns the command "delete", and the mode selection processor 210 determines that the mode for the speech input 204 is a command, then the mode selection processor 210 will send the speech input "delete" to the application program 138 as a command. When the selected mode processor results have been sent to the application program 138, then step 312 is followed by step 314.

In step 314, the speech engine correction module 200 stores the alternative mode processor results in RAM 206, or another similar type of memory or storage device. Storing the alternative mode processor results permits the speech engine correction module 200 to retrieve these results at a later time. For example, when the speech engine or the user determines that a mode error has been committed, the alternative mode processor results not initially selected by the speech engine correction module 200 may be retrieved to correct the initial error.

Step 314 is followed by decision block 316, in which the mode correction processor 216 checks for a speech recognition mode correction command. Other similar commands or functions may be detected or received by the mode correction processor 216 indicating that a mode error is present. If a speech recognition mode correction command is detected, then the "YES" branch is followed to decision block 318, in which the mode correction routine continues. If no speech recognition mode correction command is detected, then the "NO" branch is followed to step 326 to return to the start of the routine 300.

The mode correction routine 300 continues with decision block 318, in which the mode correction processor 216 determines whether a command to dictation mode correction needs to be made. If the mode error requires a command to be changed to a dictation, then the "YES" branch is followed to step 320, in which routine 400 (shown in FIG. 4) is performed. If the mode error does not require a command to be changed to a dictation, then the "NO" branch is followed to decision block 322.

In decision block 322, the mode correction processor 216 determines whether a dictation to command mode correction needs to be made. If the speech recognition mode error requires dictation to be changed to a command, then the "YES" branch is followed to step 324, in which routine 500 (shown in FIG. 5) is performed. If the speech recognition mode error does not require a dictation to be changed to a command, then the "NO" branch is followed to step 326, in which the routine 300 returns to the start.

Figure 4:
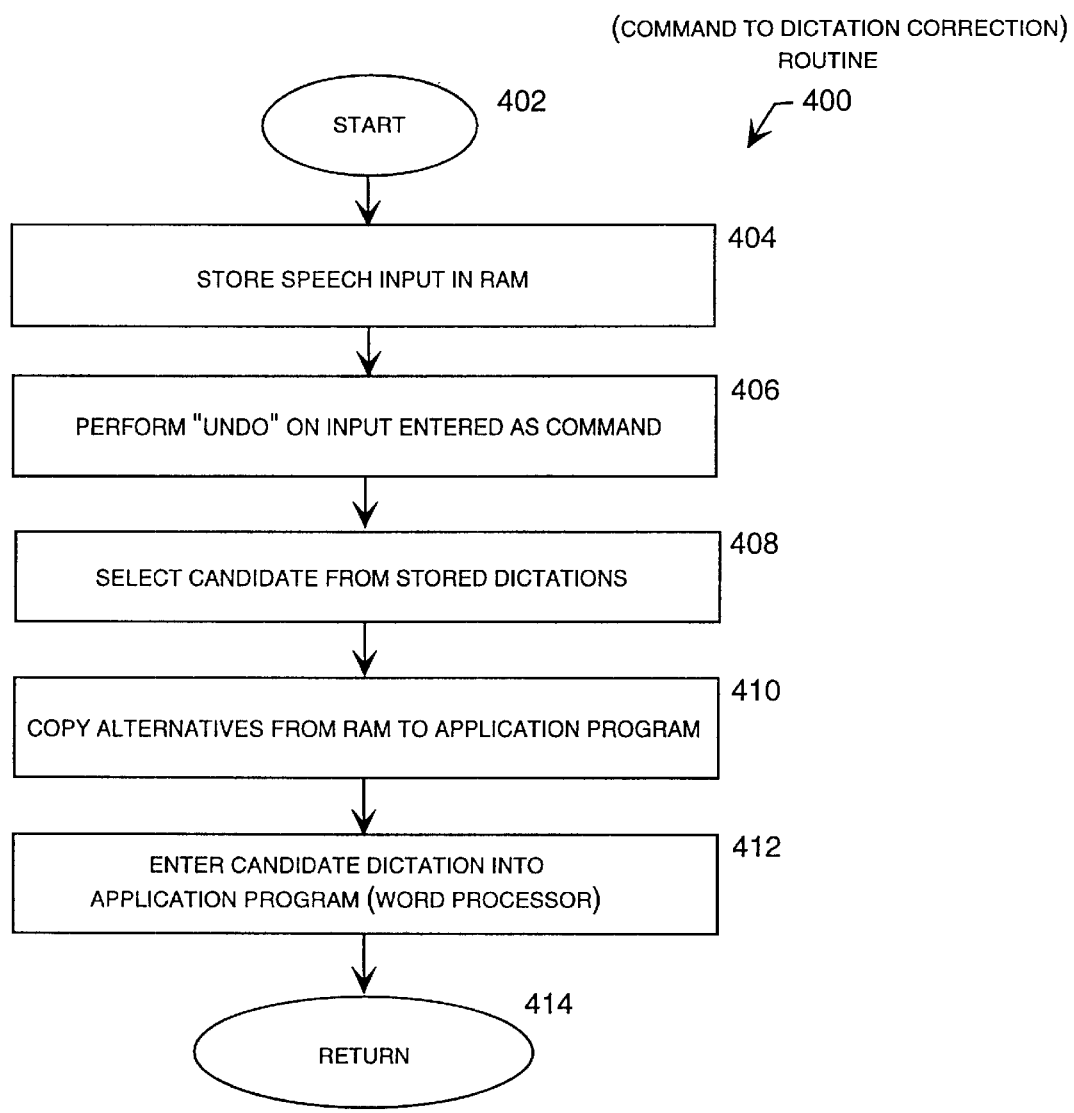
FIG. 4 is a logic flow diagram illustrating an exemplary method for correcting command to dictation speech recognition mode errors.

FIG. 4 illustrates the routine 400 in which the speech engine correction module 200 corrects a command speech recognition mode error. That is, speech input 204 that has been input into the application program 138 as a command is converted into dictation input for the application program 138 as intended by the user. Step 402 starts the routine 400 performed by the speech engine correction module 200.

Step 402 is followed by step 404, in which the speech engine correction module 200 stores the original speech input 204 into RAM 206, or any other similar memory or storage device. Storing the original speech input 204 permits recall and reprocessing of the speech input 204 at a later time. For example, the RAM 206 is useful when the routine 400 is interrupted and the original speech input 204 needs to be recalled.

Step 404 is followed by step 406, in which an "UNDO" command is entered as a command into the document. The mode correction processor 216 sends an "UNDO" command to the application program 138, and the application program 138 performs the "UNDO" on the document. The "UNDO" command recalls the last command or series of commands performed on the document by the application program 138, and reverses or undoes the last command or series of commands performed on the document. By performing an "UNDO" command, the document can be returned to its original content before the mode error occurred and the speech input 204 was input as a command instead of as dictation into the document.

Step 406 is followed by step 408, in which the mode correction processor 216 selects a candidate dictation from the dictation processor 214 results stored as alternative mode processor results in RAM 206. As described previously in step 314 in FIG. 3, the alternative mode processor results are stored in RAM 206 for later retrieval in circumstances such as when a speech recognition mode error has been detected, and the selected mode should have been the alternative mode not initially selected by the speech engine module 200. The mode correction processor 216 uses selection criteria based upon context of the document to select a candidate dictation from the alternative mode processor results.

To increase the speed of correcting the mode error, the mode correction processor 216 can automatically send the candidate dictation to the application program 138 and enter the candidate dictation into the document without prompting the user. Otherwise, the mode correction processor 216 can simply prompt the user that the candidate dictation is the selection most likely to be the correct speech input 204 dictation result, and wait for the user to acknowledge or accept the candidate dictation into the document.

Step 410 follows step 408, in which the mode correction processor 216 sends the candidate selection and all of the alternative results in RAM 206 to the application program 138. The application program 138 can then display the candidate selection as a highlighted choice among the other alternative dictation results. The user can then select the candidate selection to input into the application program 138, or the user can scroll down the list of alternative dictation results to select the desired dictation results. In some instances, such as to increase the speed of correcting a mode error, the candidate selection will be the only alternative result sent to the application program 138, and the user can be prompted to input the candidate selection, or the candidate selection can be automatically inserted into the document.

Step 412 follows step 410, in which a selected dictation selection is entered into the application program 138 as the dictation input for the document. This step provides the dictation input for the document after the speech engine correction module 200 or the user has analyzed the alternative results stored in RAM 206 for the desired dictation result, and has determined which result is most desired as the speech input 204 for a dictation into the document. Step 412 is followed by step 414, in which the routine 400 ends by returning to step 326 of FIG. 3.

Figure 5:
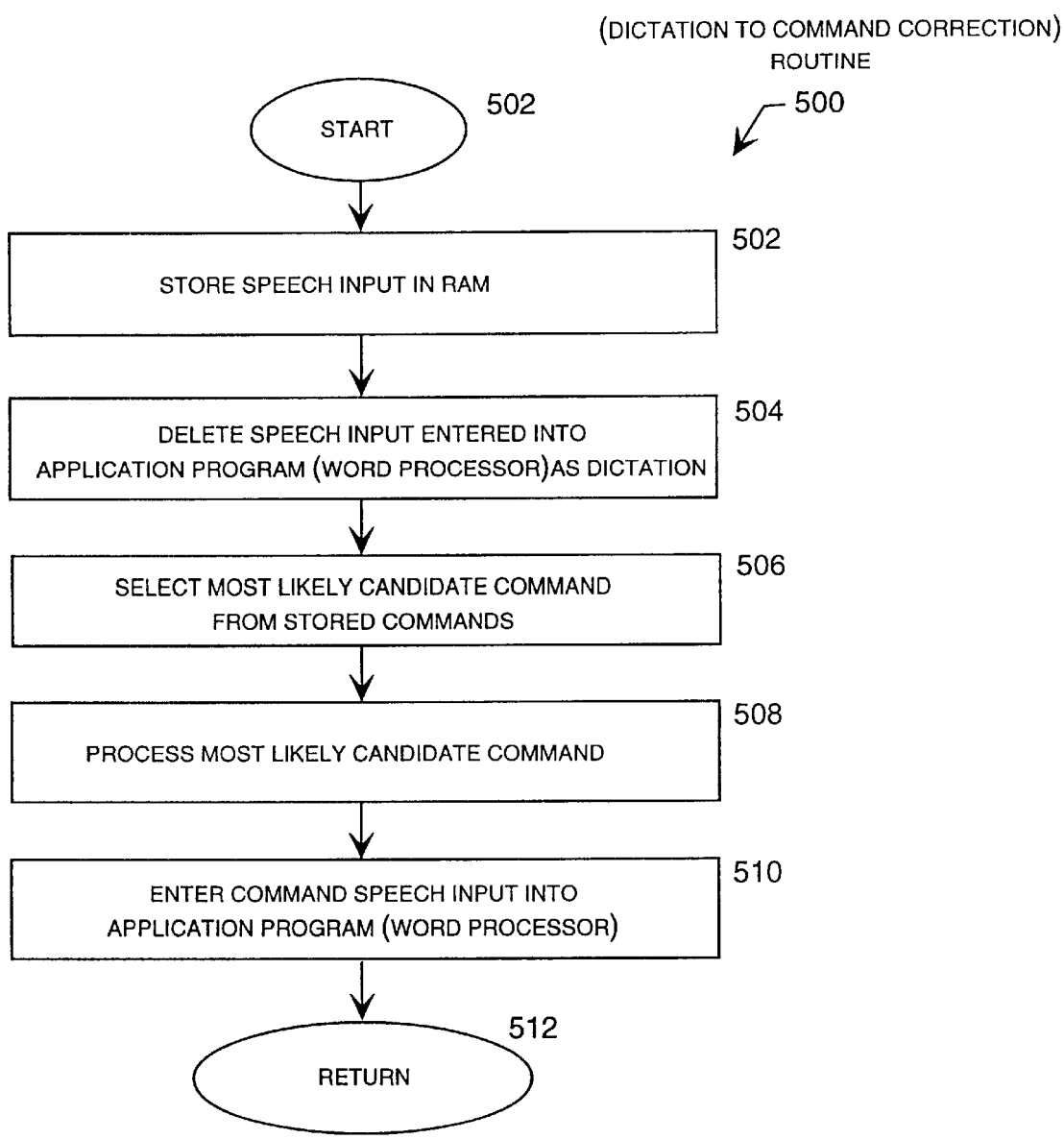
FIG. 5 is a logic flow diagram illustrating an exemplary method for correcting dictation to command speech recognition mode errors.

FIG. 5 illustrates the routine 500 in which the speech engine correction module 200 corrects dictation to command speech recognition mode errors. Such a correction is made when the mode correction processor 216 detects that speech input 204 has been incorrectly input as dictation, and the speech input 204 should be entered into the document as a command. FIG. 5 is a logic flow diagram illustrating routine 500, which begins following the "YES" branch extending from decision block 322 in FIG. 3. Routine 500 begins at step 502.

In step 502, the speech engine correction module 200 stores the received speech input 204 into RAM 206, or any other similar memory or storage device. Storing the original speech input 204 permits recall and reprocessing of the speech input 204 should the: routine 500 be interrupted and the original speech input 204 needs to be recalled. For example, the RAM 206 is useful when the routine 500 is interrupted and the original speech input 204 needs to be recalled.

Step 502 is followed by step 504, in which the mode correction processor 216 sends a "DELETE" command to the application program 138 to delete the speech input 204 incorrectly entered into the document as dictation. A "DELETE" command or any similar function can be sent to the application program 138 to remove the speech input 204 incorrectly entered into the document as dictation.

Step 504 is followed by step 506, in which the mode correction processor 216 selects a candidate command from the alternative mode processor results saved in RAM 206. As described previously in step 314 of FIG. 3, the alternative mode processor results are stored in RAM 206 for later retrieval in circumstances such as when a speech recognition mode error has been detected, and the selected mode should have been the alternative mode not initially selected by the speech engine correction module 200. The mode correction processor 216 uses selection criteria based upon context of the document or previously issued commands to select a candidate command from the alternative mode processor results.

Step 506 is followed by step 508,.in which the mode correction processor 216 sends the candidate command and all of the alternative results in RAM 206 to the application program 138. The application program 138 can then display the candidate selection as a highlighted choice among the other alternative command results. To increase the speed of correcting the mode error, the mode correction processor 216 can automatically send the candidate command to the application program 138 without prompting the user. Otherwise, the mode correction processor 216 can simply note that the candidate command is the selection most likely to be the correct speech input 204 command result Step 508 is followed by step 510, in which a selected command is entered into the application program 138. This step provides the command input for the document after the speech engine correction module 200 or the user has analyzed the alternative results stored in RAM 206 for the desired command result, and has determined which result is most desired as the speech input 204 for a command to be input into the document. Step 510 is followed by step 512, in which the routine 500 ends by returning to step 326 of FIG. 3.

Figure 6:
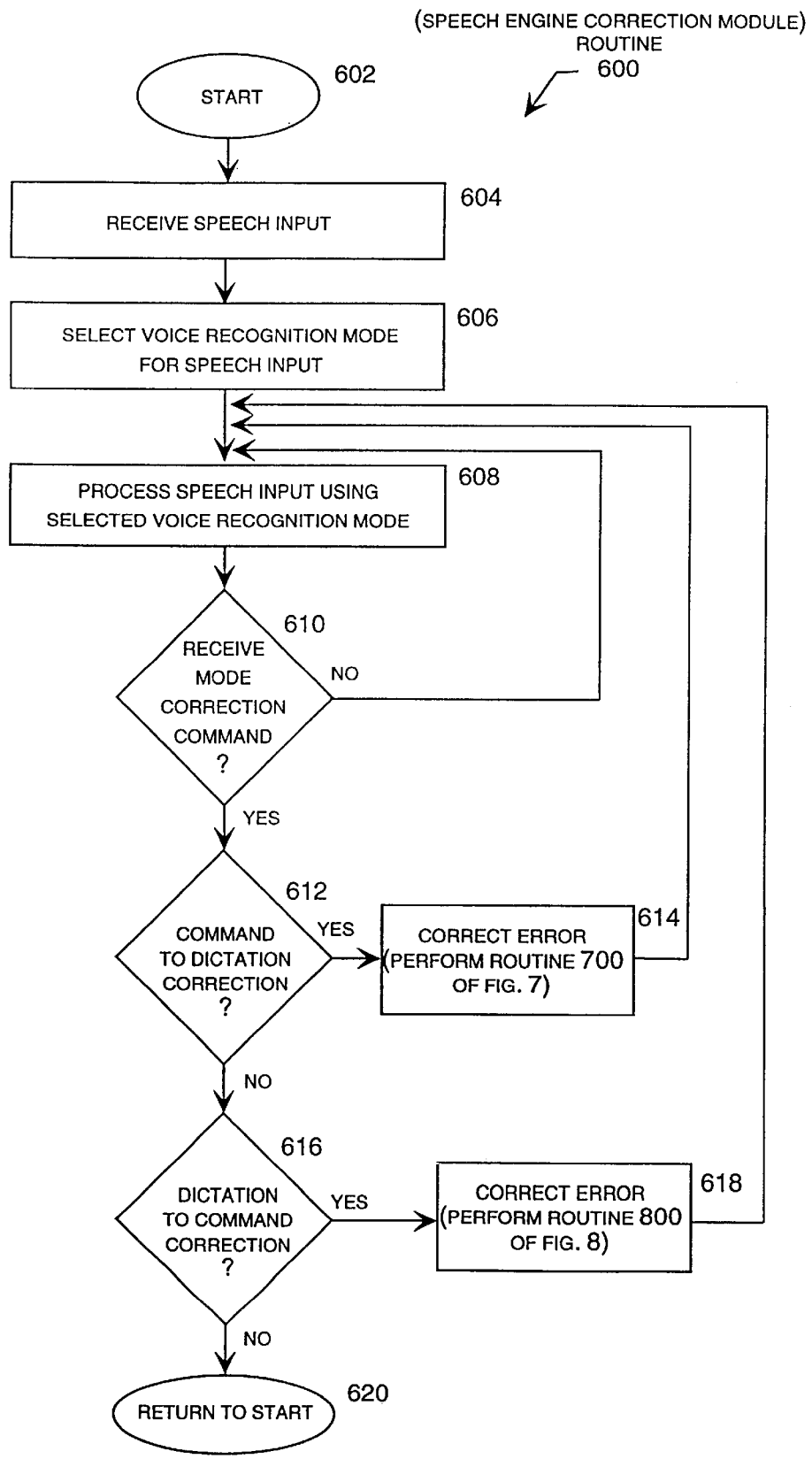
FIG. 6 is a logic flow diagram illustrating an alternative method for correcting speech recognition mode errors.

FIG. 6 is a logic flow diagram illustrating an alternative computer routine for correcting a speech recognition mode error in a document. The steps illustrated in FIG. 6 are performed by the speech engine correction module 200 operating with the application program 138. Step 602 starts the routine 600 performed by the speech engine correction module 200.

Step 602 is followed by step 604, in which the speech engine correction module 200 waits for speech input 204 from the application program 138. When speech input 204 is received by the speech engine module 200, step 604 is followed by routine 606.

In step 606, the mode selection processor 210 determines a speech recognition mode for the speech input 204. Based upon dictation selection criteria, the mode selection processor 210 determines the speech recognition mode and continues processing the speech input 204 according to the selected speech recognition mode. Suitable selection criteria can be the context of the speech input 204 and document, and content of the speech input 204. For example, when the mode selection processor 210 encounters speech input 204 consisting of the single word "delete", the mode selection processor 210 may decide based upon the literal context of the speech input 204 and document, and from the content of the speech input 204 that the speech input 204 is a command. Thus, the mode selection processor 210 continues processing the speech input 204 as a command. Suitable speech recognition modes can be dictation and command, or any other mode that can is useful in a document for an application program 138. When a speech recognition mode has been selected, then step 606 is followed by step 608.

In step 608, a mode processor 212, 214 processes the speech input 204 depending upon the selected speech recognition mode chosen in step 606. If the dictation mode is selected, the dictation processor 214 processes the speech input 204. The dictation processor 214 uses the natural language model 218 for determining the content of the dictation. Such models are commonly used in the art for converting speech input into text for a computer-readable document. Models can use clues, such as grammar and the overall meaning of a selection of text, or probabilities of word sequences, to produce additional alternatives for a candidate list and evaluate the probabilities of those alternatives. A suitable language model always returns text results for a given speech input. After the dictation processor 214 determines a text result for the speech input 204, then step 608 is followed by step 610.

Alternatively, if the command mode is selected, the command processor 212 processes the speech input 204. The command processor 212 uses the context-free grammar (CFG) language model 220 for determining the content of the command. Such models are commonly used in the art for converting speech input 204 into a command result for a given speech input 204. A suitable CFG model returns an application program command sufficiently similar to the speech input 204. After the command processor 212 determines a command result for the speech input 204, then step 608 is followed by decision block 610.

In decision block 610, the mode correction processor 216 checks for a speech recognition mode correction command. Other similar commands or functions can be detected or received by the mode correction processor 216 to indicate a mode error. If a speech recognition mode correction command is detected, then the "YES" branch is followed to decision block 612, in which the mode correction routine continues. If no speech recognition mode correction command is detected, then the "NO" branch is followed to step 608 to continue processing speech input 204 using the selected mode.

The mode correction routine 600 continues with decision block 612, in which the mode correction processor 216 determines whether a command to dictation mode correction needs to be made. If the mode error requires a command to be changed to a dictation, then the "YES" branch is followed to step 614, in which routine 700 (shown in FIG. 7) is performed. If the mode error does not require a command to be changed to a dictation, then the "NO" branch is followed to decision block 616.

In decision block 616, the mode correction processor 216 determines whether a dictation to command mode correction needs to be made. If the speech recognition mode error requires dictation to be changed to a command, then the "YES" branch is followed to step 618, in which routine 800 (shown in FIG. 8) is performed. If the speech recognition mode error does not require a dictation to be changed to a command, then the "NO" branch is followed to step 620, in which the routine 600 returns to start block 602.

Figure 7:
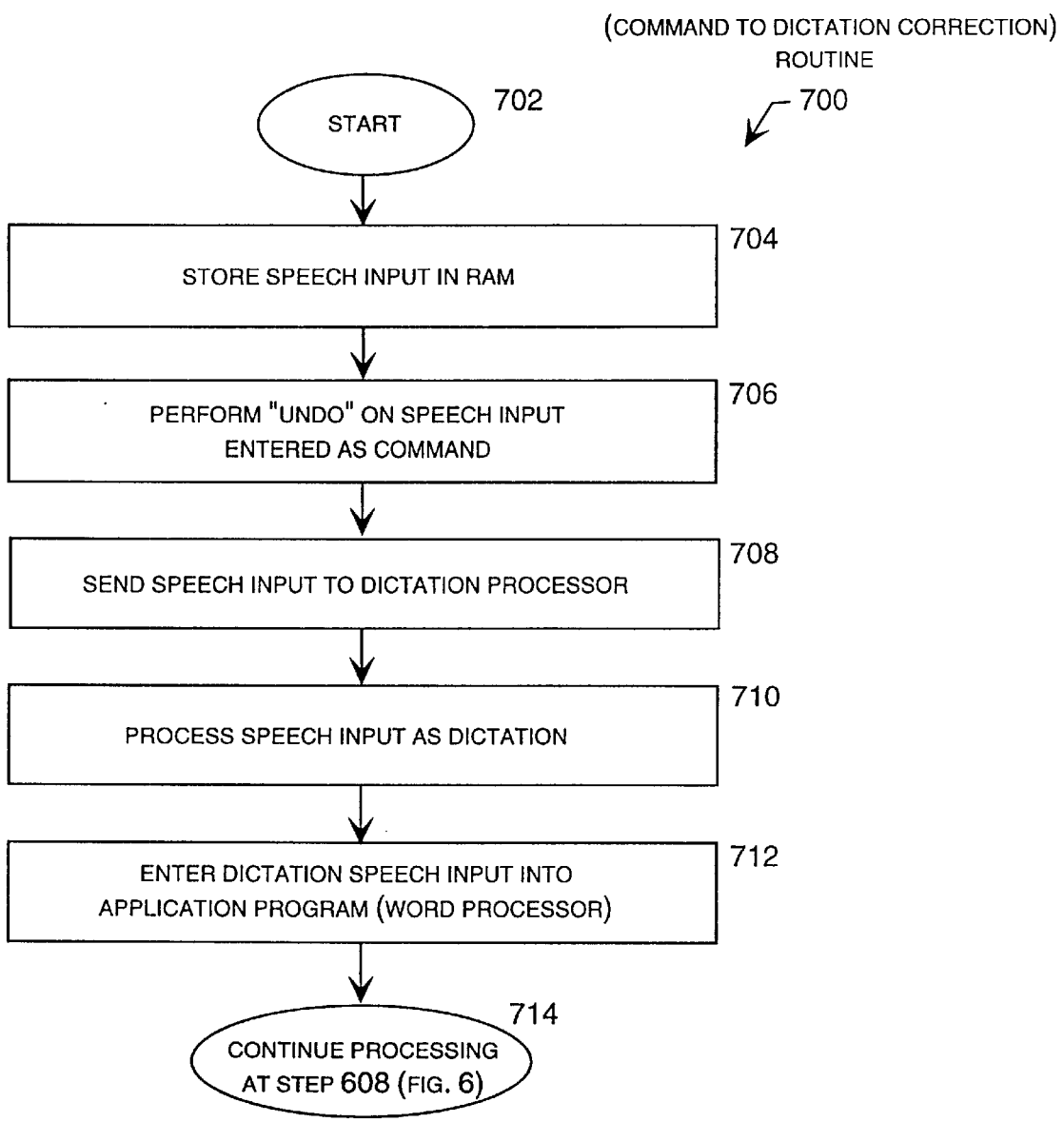
FIG. 7 is a logic flow diagram illustrating an alternative method for correcting command to dictation speech recognition mode errors.

FIG. 7 illustrates an alternative routine 700 in which the speech engine correction module 200 corrects a command speech recognition mode error. That is, the speech engine module corrects speech input 204 incorrectly entered into the application program 138 as a command by re-entering the speech input 204 as dictation intended by the user. Step 702 starts the routine 700 performed by the speech engine correction module 200.

Step 702 is followed by step 704, in which the speech engine correction module 200 stores the original speech input 204 in RAM 206. Other memory or storage devices and structures can be used to store the original speech input 204. Storing the original speech input 204 permits recall and reprocessing of the speech input at a later time. For example, the RAM 206 is useful when the routine 700 is interrupted and the original speech input 204 needs to be recalled.

Step 704 is followed by step 706, in which an "UNDO" command is entered as a command into the document. The mode correction processor 216 sends an "UNDO" command to the application program 138, and the application program 138 performs the "UNDO" on the document. The "UNDO" command recalls the last command or series of commands performed on the document by the application program 138, and reverses or undoes the last command or series of commands performed on the document. By performing an "UNDO" command, the document can be returned to its original status before the speech input 204 was incorrectly entered as a command instead of dictation.

Step 706 is followed by step 708, in which the mode correction processor 216 sends the original speech input 204 stored in RAM 206 to the dictation processor 214.

Step 708 is followed by step 710, in which the speech input 204 is processed as dictation by the dictation processor 214. The dictation processor 214 uses a natural language model (NLM) 218, such as a statistical language model (SLM), or another similar language model to process the speech input 204. Text results are returned by the dictation processor 214 for input into the document.

Step 710 is followed by step 712, in which the mode correction processor 216 sends the dictation results to the application program 138. The application program 138 can then enter the dictation input into the document. Step 712 is followed by step 714, in which the routine 700 ends by returning to step 608 of FIG. 6.

Figure 8:
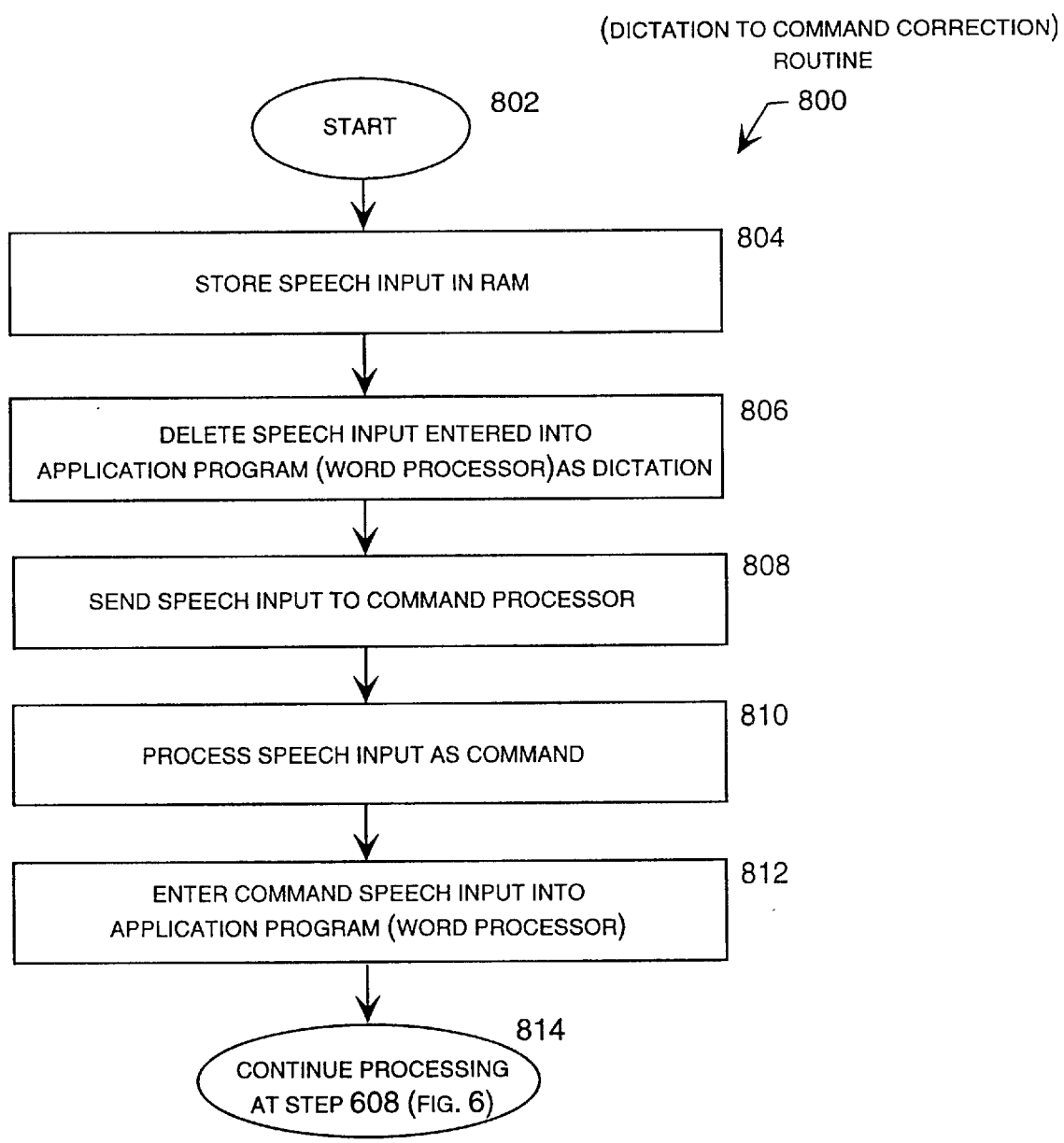
FIG. 8 is a logic flow diagram illustrating an alternative method for correcting dictation to command speech recognition mode errors.

FIG. 8 illustrates an alternative routine 800 in which the speech engine correction module 200 corrects a dictation speech recognition mode error, such as when the mode correction processor 216 detects that speech input 204 has been incorrectly input as dictation, and the speech input 204 should be entered into the document as a command. FIG. 8 is a logic flow diagram illustrating routine 800, which begins following step 616 in FIG. 6. Routine 800 begins at step 802.

Step 802 is followed by step 804, in which the speech engine correction module 200 stores the received speech input 204 into RAM 206. Other memory or storage devices can be used to store the speech input 204. Storing the original speech input 204 permits recall and reprocessing of the speech input at a later time. For example, the RAM 206 is useful when the routine 800 is interrupted and the original speech input 204 needs to be recalled.

Step 804 is followed by step 806, in which the mode correction processor 216 sends a "DELETE" command to the application program to delete the speech input 204 incorrectly entered into the document as dictation. Other similar commands or functions can be sent to the application program 138 to remove the speech input 204 incorrectly entered into the document as dictation.

Step 806 is followed by step 808 in which the mode correction processor 216 sends the original speech input 204 stored in RAM 206 to the command processor 212.

Step 808 is followed by step 810, in which the speech input 204 is processed as a command by the command processor 212. The command processor 212 uses a context-free grammar (CFG) language model 220 or another similar language model to process the speech input 204. Command results are returned by the command processor 212 for input into the application program 138.

Step 810 is followed by step 812, in which the mode correction processor 216 sends the command results to the application program 138. The application program 138 can then enter the command input into the document. Step 812 is followed by step 814, in which the routine 800 ends by returning to step 608 of FIG. 6.

In view of the foregoing, it will be appreciated that the invention provides a speech engine correction module for correcting speech recognition mode errors in a document for a program. It should be understood that the foregoing relates only to the exemplary embodiments of the present invention, and that numerous changes may be made therein without departing from the spirit and scope of the invention as defined by the following claims.

The invention claimed is:

1. A computer-readable medium having computer-executable instructions comprising:
   a speech engine configured for entering speech input into a command processor and a dictation processor;
   processing the speech input to obtain a first result from the command processor and a second result from the dictation processor;
   selecting a speech recognition mode for the speech input; and
   sending either the first result or the second result to a document based upon the selected speech recognition mode.

2. The computer-readable medium of claim 1, wherein the speech engine is further configured for:
   storing an alternative result, wherein the alternative result is the first result or the second result not selected based on the speech recognition mode;
   detecting a speech recognition mode error in the document;
   undoing any changes made to the document based upon entry of the previously selected result; and
   sending the alternative result to the document for entry into the document.

3. A computer-readable medium having computer-executable instructions comprising:
   a speech engine configured for entering speech input into a command processor or a dictation processor;
   storing the speech input;
   selecting a speech recognition mode for the speech input;
   processing the speech input to obtain a first result from a first processor, wherein the first processor is either the command processor or the dictation processor;
   sending the first result to a document; and
   in response to detecting a speech recognition mode error in the document based on the first result, processing the speech input in a second processor to obtain a second result, wherein the second processor is either the command processor or the dictation processor, and the second processor is not the same as the first processor.

4. The computer-readable medium of claim 3, wherein the speech engine is further configured for:
   detecting a speech recognition mode error in the document;
   undoing any changes made to the document based upon the first result, wherein the first result is obtained from the command processor;
   processing the speech input to obtain a second result from the dictation processor; and
   sending the second result to the document.

5. A computer-readable medium having computer-executable instructions comprising:
   an application program for entering input into a document;
   a speech engine configured for processing input for the application program,
   processing the input in a processor to obtain a first result,
   processing the input in the processor to obtain a second result,
   determining a mode for the input with a mode selection processor,
   selecting a result based upon the selected mode with the mode selection processor,
   sending the selected result to the application program to be entered into the document,
   storing an alternative mode result in a memory device,
   detecting a mode error with a mode correction processor,
   in response to detecting a mode error,
      undoing changes made to the document based upon the previously selected result,
      retrieving the alternative mode result, and
      sending the alternative mode result to the application program to be entered into the document.

6. The computer-readable medium of claim 5, wherein the input into the document comprises human speech.

7. The computer-readable medium of claim 5, wherein the processor is further configured for:
   processing the input to obtain a command result.

8. The computer-readable medium of claim 5, wherein the processor is further configured for:
   processing the input to obtain a dictation result.

9. The computer-readable medium of claim 5, wherein the mode comprises command or dictation, or a combination of the two.

10. The computer-readable medium of claim 5, wherein the memory device comprises a rewriteable memory device such as RAM.

11. The computer-readable medium of claim 5, wherein the step of detecting a mode error with a mode correction processor, further comprises:
  receiving a command from a user that a mode error has occurred.

12. The computer-readable medium of claim 5, further comprising the step:
  determining a candidate mode result from the alternative mode result.

13. The computer-readable medium of claim 12, further comprising the step:
  prompting a user to select the candidate mode result among a list of alternative mode results.

14. The computer-readable medium of claim 5, further comprising the step:
  entering the alternative mode result into the document.

15. A computer-readable medium having computer-executable instructions comprising:
  an application program for entering input into a document;
  a speech engine configured for processing input for the application program,
  selecting a mode for the input with a mode selection;
  processing the input in a processor to obtain a first result,
  sending the first result to the application program to be entered into the document,
  storing the input in a memory device,
  detecting a mode error with a mode correction processor,
  in response to detecting a mode error,
    undoing changes made to the document based upon the previously selected result,
    retrieving the input from the memory device,
    processing the input in the processor to obtain a second result,
    sending the second result to the application program to be entered into the document.

16. The computer-readable medium of claim 15, wherein the input into the document comprises human speech.

17. The computer-readable medium of claim 15, wherein the processor is further configured for:
  processing the input to obtain a command result.

18. The computer-readable medium of claim 15, wherein the processor is further configured for:
  processing the input to obtain a dictation result.

19. The computer-readable medium of claim 15, wherein the mode comprises command or dictation, or a combination of the two.

20. The computer-readable medium of claim 15, wherein the memory device comprises a rewriteable storage device such as RAM.

21. The computer-readable medium of claim 15, further comprising the step:
  receiving a command from a user that a mode error has occurred.

22. The computer-readable medium of claim 15, further comprising the step:
  entering the second result into the document.

23. A method for correcting a speech recognition mode error in a document comprising:
  receiving speech input from an application program for input into the document;
  processing the speech input in a processor to obtain a first result,
  processing the speech input in the processor to obtain a second result,
  determining a speech recognition mode for the speech input using a mode selection processor,
  selecting a result based upon the selected speech recognition mode,
  sending the selected result to the application program to be entered into the document,
  storing an alternative mode result in a memory device,
  detecting a speech recognition mode error with a mode correction processor,
  in response to detecting a speech recognition mode error,
    undoing changes made to the document based upon the previously selected result,
    retrieving the alternative mode result, and
    sending the alternative mode result to the application program to be entered into the document.

24. The method of claim 23, wherein the first result is a command result.

25. The method of claim 23, wherein the first result is a dictation result.

26. The method of claim 23, wherein the mode correction processor is further operable for:
  receiving a command from a user that a mode error has occurred.

27. The method of claim 23, wherein the mode correction processor is further operable for:
  determining a candidate mode result from the alternative mode result.

28. The method of claim 27, wherein the mode correction processor is further operable for:
  prompting a user to select the candidate mode result among a list of alternative mode results.

29. The method of claim 23, wherein the mode correction processor is further operable for:
  entering the alternative mode result into the document.

30. A computer-readable storage device storing a set of computer-executable instructions for performing the method of claim 23.

31. An apparatus for carrying out the method of claim 23.

32. A method for correcting a speech recognition mode error in a document comprising:
  receiving speech input from an application program for input into the document;
  selecting a speech recognition mode for the speech input with a mode selection processor;
  processing the speech input in a processor to obtain a first result,
  sending the first result to the application program to be entered into the document,
  storing the speech input in a memory device,
  detecting a mode error with a mode correction processor,
  in response to detecting a mode error,
    undoing changes made to the document based upon the previously selected result,
    retrieving the speech input from the memory device,
    processing the speech input in the processor to obtain a second result, and,
    sending the second result to the application program to be entered into the document.

33. The method of claim 32, wherein the first result is a dictation result.

34. The method of claim 32, wherein the first result is a command result.

35. The method of claim 32, wherein the mode correction processor is further operable for:

receiving a command from a user that a mode error has occurred.

36. The method of claim 32, wherein the mode correction processor is further operable for:

entering the second result into the document.

37. A computer-readable storage device storing a set of computer-executable instructions for performing the method of claim 32.

38. An apparatus for carrying out the method of claim 32.

39. A computer-readable medium having computer-executable instructions comprising:

an application program for entering text or commands into a document;

a speech engine program configured for processing speech input into text or commands for the application program, processing the speech input in a dictation processor to obtain a dictation result, processing the speech input in a command processor to obtain a command result, determining a speech recognition mode for the speech input, selecting a result based upon the speech recognition mode, sending the selected result to the application program to be entered into the document, storing an alternative speech recognition mode result in a memory device, detecting a speech recognition mode error, in response to detecting a speech recognition mode error, undoing changes made to the document based upon the previously, selected result, retrieving the alternative speech recognition mode result, sending the alternative speech recognition mode result to the application program, and entering the alternative speech recognition mode result into the document.

40. A computer-readable medium having computer-executable instructions comprising:

an application program for entering text or commands into a document;

a speech engine configured for processing text or commands for the application program, selecting a first mode for the text or commands with a first mode selection, processing the text or commands in a processor to obtain a first result, sending the first result to the application program to be entered into the document, storing the text or commands in a memory device, detecting a mode error with a mode correction processor, in response to detecting a mode error, undoing changes made to the document based upon the previously selected result, retrieving the text or commands from the memory device, processing the text or commands in the processor to obtain a second result, sending the second result to the application program, and entering the second result into the document.

41. The computer-readable medium of claim 1, further comprising an application program for entering the first or second result into the document.

42. The computer-readable medium of claim 3, further comprising an application program for entering the first or second result into the document.

43. The computer-readable medium of claim 5, wherein the processor comprises a command processor for producing command results and a dictation processor for producing dictation results.

44. The computer-readable medium of claim 40, wherein the processor comprises a command processor for producing command results and a dictation processor for producing dictation results.

45. The computer-readable medium of claim 1, wherein the speech engine is further configured for storing an alternative result, wherein the alternative result is the first result or second result not selected based on the speech recognition mode.

* * * * *